Jan. 6, 1959 F. P. ADLER 2,867,178
LADING STRAP ANCHOR FOR FLAT CARS
Filed Jan. 11, 1954 2 Sheets-Sheet 1
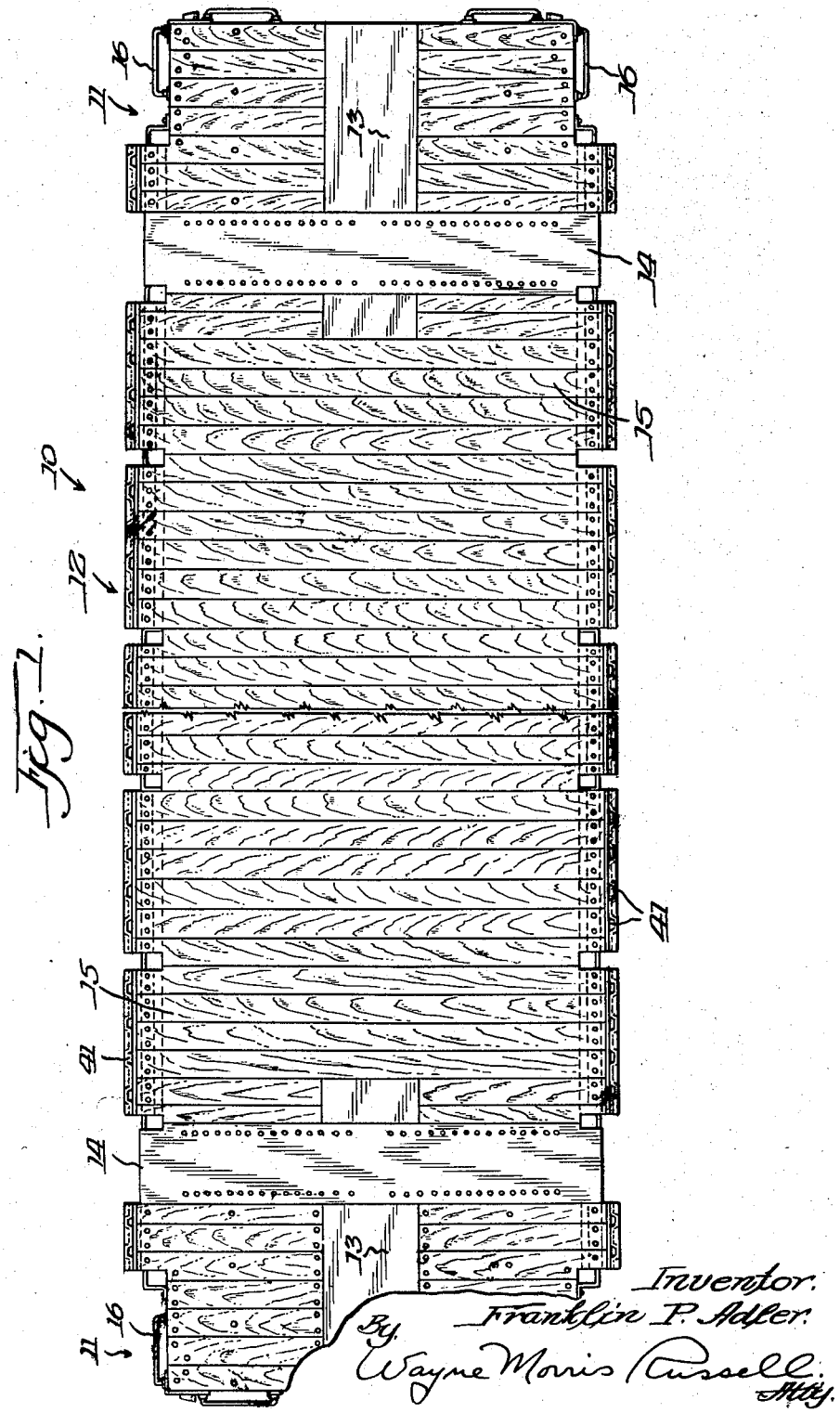

Jan. 6, 1959   F. P. ADLER   2,867,178
LADING STRAP ANCHOR FOR FLAT CARS
Filed Jan. 11, 1954   2 Sheets-Sheet 2
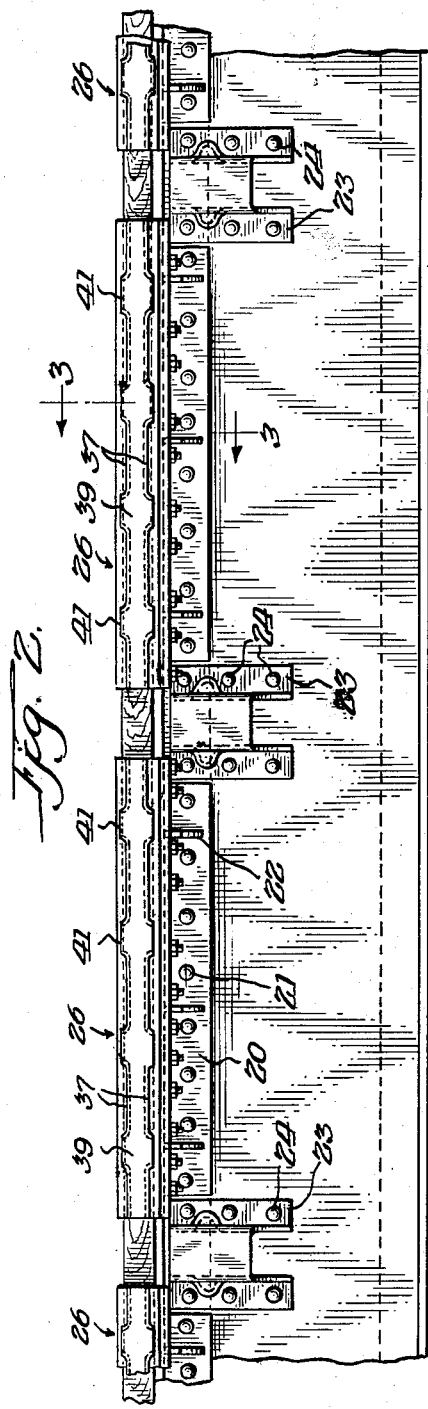
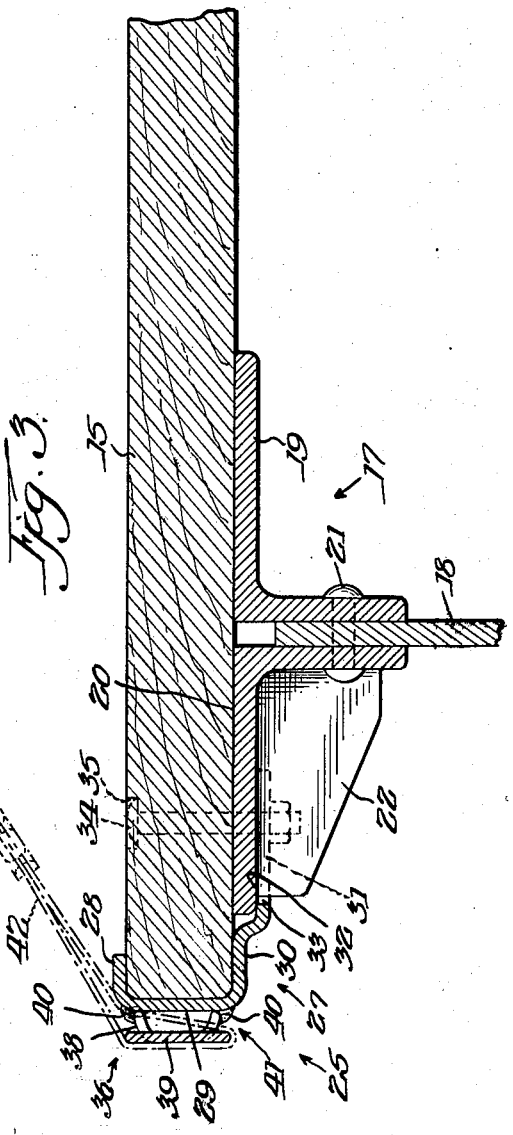
Inventor:
Franklin P. Adler.
By Wayne Morris Russell
Atty.

2,867,178

LADING STRAP ANCHOR FOR FLAT CARS

Franklin P. Adler, Michigan City, Ind., assignor to Pullman-Standard Car Manufacturing Company, Chicago, Ill., a corporation of Delaware Application January 11, 1954, Serial No. 403,141

4 Claims. (Cl. 105—369)

This invention relates to improvements in freight carrying vehicles such as a railway flat car.

The adaptability of a flat car to handle various types of lading is of the utmost importance to shippers. Of long standing usage for the primary purpose of preventing lading from shifting sidewise is the provision of a plurality of wooden upright posts inserted in stake or post pockets along the side edges of the flat car. When the posts are not necessary, the pockets may be used as lading strap openings. Various other methods and devices are used to increase the adaptability of the car. Holding devices are nailed down to the wooden floor boards, additional openings along the side edges of the floor are provided for anchoring purposes, bars, clamps and anchors used in conjunction with sliding or fixed holding fixtures for the receipt of the lading straps are also in use. To an improvement over the aforementioned devices, the applicant directs this invention, which includes a further adaptation of applicant's lading strap anchor disclosed in patent application, Serial No. 252,033, filed October 19, 1951.

Thus, a primary object of this invention is to provide a simplified lading strap anchor device to be used along the side edges of a flat freight hauling vehicle.

Another object of this invention is to provide an economical lading strap anchor device which may be installed on a flat freight hauling vehicle without requiring any change in the existing vehicle structure.

A further object of this invention is to provide a readily attachable lading strap anchor device to be used on a flat freight hauling vehicle and which provides a plurality of lading strap openings in addition to the usual stake pockets.

Yet another object of this invention is to provide a fixed lading strap anchor device so located on a flat freight hauling vehicle as not to interfere with the lading, thereby also preventing the possibility of damage to the device.

Still a further object of this invention is to provide a two-piece lading strap anchor device adapted to be quickly installed along the side edges of flat freight hauling vehicle and which has sufficient strength to hold a usual load.

Yet a further object of this invention is to provide a lading strap anchor device having no moving parts and designed for economical mass production.

The aforementioned and other objects of this invention will be defined in the following description and drawings in which:

Fig. 1 is a plan view of a railway flat car embodying the invention;

Fig. 2 is a fragmentary side elevation of the flat car in Fig. 1; and

Fig. 3 is a transverse vertical sectional view of the invention taken along the line 3—3 of Fig. 2.

Although one specific embodiment is depicted and described herein, it is to be understood that the invention is not to be so limited but may be included in other analogous embodiments for the same purpose and function and that various modifications and alterations of the invention may be made which would not deviate from the spirit and the scope of the invention as delineated in the appended claims.

Referring to the drawings, a railway flat car 10 having ends 11—11 and sides 12—12 is illustrated. Other than the center sill cover plates 13—13 and the bolster cover plates 14—14 at each end 11 of the car, the major part of the car flooring is made up of transversely extending wooden planks 15 laid side by side. Intermediate the ends 11—11 where side ladders 16 are provided, the planks 15 extend slightly beyond the side sill 17 on each side of the car.

The side sill vertical member 18 is joined at the top by L-shaped beams 19 and 20 which are secured to the member 18 as by rivets 21 so that these beams actually constitute portions of the side sill which serve as end supports for the planks 15. Vertically disposed gusset plates 22 may be secured to the outer L beam 20 for structural purposes. Side stake holders 23 are interposed between sections of the beam 20 forming stake pockets for the insertion of stakes or posts. These holders are secured to the outer side of the side sill 17 by means such as rivets 24.

When stakes are not used, the holders 23 may be used as lading strap holders, however, a larger number of lading strap openings are usually desired, even when stakes are not used in the holders 23. For this purpose, a lading strap anchor device 25 is provided.

The device 25 may extend the entire length of the extended plank sides of the car, however, where stake holders 23 are used, the device is broken into elongated sections 26. Each section 26 is comprised of a guide plate 27 which extends substantially the entire longitudinal distance between holders 23. The guide plate 27 aids in the guiding of the lading strap around the lading strap anchor 36. The guide plate 27 has a horizontally extending upper portion 28 which extends over a top end portion of a plank 15, a vertically extending portion 29 which contacts the end of a plank, and a lower portion 30 which extends under and engages a lower end portion of a plank, the lower portion 30 having a horizontally offset extension 31 which extends under and engages the underneath side 32 of the L beam 20. Transverse slots 33 are provided at spaced intervals along the extension 31 to receive the gusset plates 22. The guide plate 27 is secured to the planks 15 and the side sill beam 20 for structural stability by means of nut and bolt units 34 which extend through the extension 31 and which are flush with the top surface of the planks 15 by having bolt head pockets 35 in the planks.

A lading strap anchor 36 which is comprised of a flat elongated metal strip wherein spaced opposite side portions 37 have been bent inwardly forming legs 38, thereby leaving flat intermediate portions 39, is secured in parallel relation to the vertical portion 29 of the guide plate 27 by welding the anchor portion legs 38 to the guide plate portion 29 as at 40 (Fig. 3). The anchor 36 extends substantially the entire length of the plate 27, the intermediate portions 39 of the anchor thereby forming a plurality of openings 41 in each of which a lading strap 42 may be inserted.

Thus it may be seen that a lading strap anchor device has been provided for use along the side edges of a flat freight hauling vehicle, which device adds a plurality of lading strap anchoring points to the car without changing the existing car structure, may be readily attached to the car, has sufficient holding capacity for the usual load, would not interfere with the lading, is removed from the lading so as to prevent damage to itself, is susceptible of economical mass production, and which has no moving parts, thereby increasing its efficiency.

What is claimed is:

1. In combination with a flat freight hauling vehicle having a floor and a side sill, a guide member and lading strap anchoring strip assembly comprising a longitudinally extending guide member secured to said floor and said sill and extending out laterally beyond an end surface of said floor, said guide member including a generally upright portion adjacent to and paralleling said end surface of the floor and a bottom edge flange extending inwardly integrally from said upright portion and engaging the lower surface of said floor, and said assembly including also a longitudinally extending anchoring strip extending laterally beyond said upright portion of the guide member and secured thereto at a plurality of longitudinally spaced locations, said anchoring strip comprising a generally flat elongated plate member disposed in a generally upright plane substantially parallel to the plane of said upright portion of the guide member and having a plurality of short lengths of its upper and lower marginal edge portions extending inwardly at longitudinally spaced intervals forming attachment legs with the ends thereof welded to said upright portion of the guide member thereby spacing from said upright portion flat lengths of the anchoring strip extending lengthwise thereof between said attachment legs to provide a plurality of openings for receiving lading straps.

2. The combination claimed in claim 1 in which said guide member includes a top edge flange extending integrally inwardly from said upright portion and engaging the upper surface of said floor.

3. The combination claimed in claim 1 including a plurality of stake pockets spaced longitudinally along said end surface of the floor, and in which a guide member and anchoring strip assembly extends between each pair of adjacent stake pockets.

4. The combination claimed in claim 1 including fastening means extending through said floor, side sill and horizontal flange of the guide member securing said assembly to said floor and said side sill.

References Cited in the file of this patent

UNITED STATES PATENTS

| Re. 23,394 | Logmann et al. | July 24, 1951 |
| 1,867,352 | Churgay et al. | July 12, 1932 |
| 2,481,598 | Jones | Sept. 13, 1949 |
| 2,613,614 | Goodwin | Oct. 14, 1952 |
| 2,640,442 | Johnsen | June 2, 1953 |
| 2,709,972 | Ingram | June 7, 1955 |
| 2,711,701 | Madland | June 28, 1955 |
| 2,755,747 | Oakley | July 24, 1956 |
| 2,759,432 | Adler | Aug. 21, 1956 |
| 2,763,219 | Adler | Sept. 18, 1956 |